United States Patent
Sekiya

(10) Patent No.: US 9,353,835 B2
(45) Date of Patent: May 31, 2016

(54) CONTINUOUSLY VARIABLE TRANSMISSION DEVICE

(71) Applicant: MIKUNI CORPORATION, Tokyo (JP)

(72) Inventor: Mitsuru Sekiya, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 14/415,836

(22) PCT Filed: Jul. 31, 2013

(86) PCT No.: PCT/JP2013/070701
§ 371 (c)(1),
(2) Date: Jan. 20, 2015

(87) PCT Pub. No.: WO2014/021360
PCT Pub. Date: Feb. 6, 2014

(65) Prior Publication Data
US 2015/0233451 A1  Aug. 20, 2015

(30) Foreign Application Priority Data

Aug. 1, 2012 (JP) ................. 2012-170835

(51) Int. Cl.
| | |
|---|---|
| F16H 15/48 | (2006.01) |
| F16H 13/08 | (2006.01) |
| F16H 61/664 | (2006.01) |
| F16H 63/06 | (2006.01) |
| F16H 57/04 | (2010.01) |

(52) U.S. Cl.
CPC ............ *F16H 13/08* (2013.01); *F16H 57/0434* (2013.01); *F16H 57/0487* (2013.01); *F16H 61/6649* (2013.01); *F16H 63/067* (2013.01)

(58) Field of Classification Search
None
See application file for complete search history.

(56) References Cited

U.S. PATENT DOCUMENTS 5,730,681 A   3/1998   Rondinelli

FOREIGN PATENT DOCUMENTS

| CN | 1129972 | 8/1996 |
|---|---|---|
| JP | 6-280961 | 10/1994 |
| JP | 9-501760 | 2/1997 |

(Continued)

OTHER PUBLICATIONS

International Search Report issued Oct. 8, 2013 in International Application No. PCT/JP2013/070701.

*Primary Examiner* — Dirk Wright
(74) *Attorney, Agent, or Firm* — Wenderoth, Lind & Ponack, L.L.P.

(57) ABSTRACT

A continuously variable transmission device includes an input shaft, an output shaft, an input roller, an output ring, a transmission ring, a plurality of planetary rollers including a first conical portion externally contacted to the input roller and internally contacted to the output ring and a second conical portion internally contacted to the transmission ring, a movable holder which holds the plurality of planetary rollers to be capable of rotating about each rotating axis line and revolving about the center axis line, and a loading cam mechanism (CM1, CM2) which generates a thrust load. The input roller, the output ring, and the transmission ring are formed so that each face being contacted to the planetary roller is formed to have a convex curved face. The planetary rollers are supported by the movable holder so that an inclination angle of a rotation axis line against the center axis line is variable.

10 Claims, 10 Drawing Sheets

(56) References Cited

FOREIGN PATENT DOCUMENTS

| | | |
|---|---|---|
| JP | 9-177920 | 7/1997 |
| JP | 10-274306 | 10/1998 |
| JP | 2004-36853 | 2/2004 |
| JP | 2007-255699 | 10/2007 |
| JP | 2009-57993 | 3/2009 |
| JP | 2010-112451 | 5/2010 |
| WO | 95/06209 | 3/1995 |

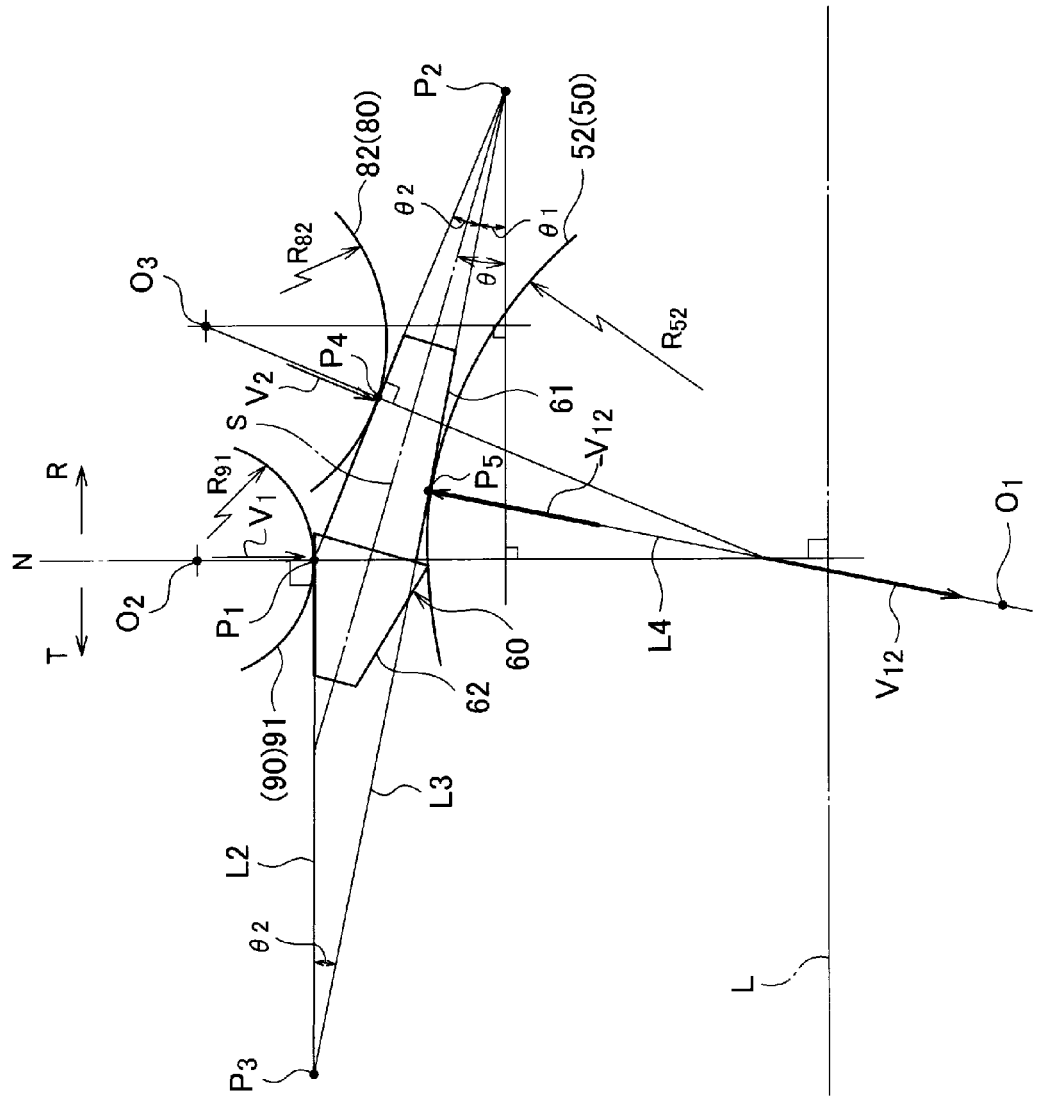

CONTINUOUSLY VARIABLE TRANSMISSION DEVICE

TECHNICAL FIELD

The present invention relates to a continuously variable transmission device which performs transmission to an output shaft with traction drive using a traction force as continuously varying rotation speed of an input shaft, and more particularly, relates to a continuously variable transmission device which continuously performs continuous speed changing using conical planetary rollers.

BACKGROUND ART

There has been conventionally known a continuously variable transmission device including an input shaft, an input roller (an inner ring, a drive face, or the like) which is rotated integrally with the input shaft, an output shaft which is arranged coaxially with the input shaft, an output ring (an outer ring, a driven face, or the like) which is rotated as being interlocked with the output shaft, a plurality of cone-shaped planetary rollers (taper rollers, double cones, or the like) which are arranged around a center axis line of the input shaft and the output shaft so as to roll as externally contacted to the input roller and internally contacted to the output ring for reducing speed of rotation of the input roller and transmitting the rotation to the output ring, a movable holder (a retainer, a cone holder, or the like) which holds the plurality of planetary rollers to be capable of rotating and revolving about the center axis line, a transmission ring (a non-rotating outer ring, or the like) which performs speed changing owing to that the position thereof in the direction of the center axis line in a state of being externally contacted to the plurality of planetary rollers, a loading cam mechanism which generates a thrust load in the direction of the center axis line of the input shaft and the output shaft, and the like (see Patent Literatures 1 to 4).

According to the continuously variable transmission device, when the input shaft is rotated, the input roller is rotated integrally therewith, the planetary rollers externally contacted to the input roller are rotated (rotation and revolution), the output ring is rotated due to rotation of the planetary rollers, and the output shaft is rotated integrally with the output ring. The rotation speed of the output shaft is to be increased and decreased in accordance with the position of the transmission ring.

Further, owing to that a thrust load is generated in the direction of the center axis line by the loading cam mechanism and a normal load (normal force) for traction transmission is generated at the planetary rollers, traction transmission is to be performed at each contact regions.

In the conventional continuously variable transmission device, the rotation axis line of the planetary roller is kept at a constant inclination angle against the center axis line of the input shaft and the output shaft. Accordingly, when a contact point of the transmission ring with the planetary roller is varied in position with movement of the transmission ring, balances of normal forces respectively between the input roller and the planetary roller, between the output ring and the planetary roller, and between the transmission ring and the planetary roller are to be lost and an excessive force is exerted on the planetary roller. Here, even when a normal force generated by the output torque (load torque) is constant, normal forces at respective parts are varied. Consequently, it is difficult to set an appropriate traction coefficient.

Further, there is a fear that stable traction transmission cannot be performed owing to that variation occurs in the contacting state at the traction transmission region caused by variation of assembling the plurality of planetary rollers and the like. Accordingly, it has been required to accurately control dimensions of the planetary rollers, the movable holder, and the like and mutual assembling thereof, and the like.

Further, in the conventional continuously variable transmission device having a structure that the loading cam mechanism is arranged at the output side, when an output load (load torque) is rapidly decreased a pressing force in the thrust direction due to loading cam mechanism is disappeared to cause a normal force for traction transmission to disappear as well. Further, when once torque transmission is interrupted, there is a fear that a drive torque input from the input shaft is not transmitted to the output shaft and torque transmission cannot be performed as a result.

Further, the traction transmission portion is not displaced even when a load to press the output ring is varied due to the loading cam mechanism at the output side. Therefore, even when a load torque at the output shaft becomes large, the transmission ratio is not varied automatically. That is, it is not possible to provide an automatic shift-down function. Further, in a case that a reverse torque (load torque) such as engine braking is exerted to the output shaft, an excessive thrust load is exerted to the output ring to cause a fear that the traction transmission portion is locked.

Further, in the conventional continuously variable transmission device, no regard is given to circulation of lubricant oil during operation of the traction transmission. Therefore, there is a fear to cause seizing at bearings and the like. Further, there is a fear that smooth motion for moving the transmission ring cannot be obtained owing to occurrence of biting, wearing, and the like at a drive force transmission region when the transmission ring is moved. Furthermore, any measures are not provided for interference between the transmission ring and the movable holder which holds the planetary rollers, and the like.

CITED LITERATURE

Patent Literature

Patent Literature 1: Japanese Patent Application Laid-Open No. 6-280961
Patent Literature 2: Japanese Patent Application Laid-Open No. 10-274306
Patent Literature 3: Japanese Patent Application Laid-Open No. 9-177920
Patent Literature 4: Japanese Patent Application Laid-Open No. 2007-255699

SUMMARY OF THE INVENTION

To address the above issues, an object of the present invention is to provide a continuously variable transmission device with which a stable normal force can be obtained at the traction transmission portion in accordance with an output load by automatically balancing the planetary rollers at appropriate positions, the traction transmission portion can be prevented from being locked during deceleration or the like, smooth operation of functional components can be obtained by ensuring an internal lubrication action, a sufficient traction force or a sufficient transmission torque can be ensured, and speed changing can be reliably controlled to a desired transmission ratio, while achieving structural simplification, miniaturization, functional reliability improvement, and the like.

A continuously variable transmission device according to the present invention includes a housing, an input shaft which has a center axis line, an input roller which is rotated integrally with the input shaft, an output shaft which is arranged coaxially with the input shaft, an output ring which is rotated integrally with the output shaft, a transmission ring which is arranged movably in a direction of the center axis line as having the center thereof on the center axis line, a plurality of planetary rollers which are arranged at equal intervals in an imaginary conical face having the vertex thereof on the center axis line, each planetary roller including a first conical portion which is externally contacted to the input roller and internally contacted to the output ring and a second conical portion which is internally contacted to the transmission ring, a movable holder which holds the plurality of planetary rollers to be capable of rotating about each rotation axis line and revolving about the center axis line, and a loading cam mechanism which generates a thrust load in the direction of the center axis line. Here, the input roller, the output ring, and the transmission ring are formed so that each face being contacted to the planetary roller is formed to have a convex curved face having a predetermined curvature on a plane which includes the rotation axis line of the planetary roller and the center axis line, and the planetary rollers are supported by the movable holder so that an inclination angle of the rotation axis line against the center axis line is variable.

According to the configuration, when the transmission ring is moved in the direction of the center axis line, the planetary roller is automatically balanced to a position where a moment exerted to the planetary roller is continuously zero (a position where the moment is not generated, that is, a position where normal forces at three contact points are balanced), while an inclination angle of the rotation axis line of the planetary roller is appropriately varied in a state of being contacted to the convex curved face of the input roller, the convex curved face of the output ring, and the convex curved face of the transmission ring. Accordingly, an excessive force can be prevented from being exerted on the planetary rollers, a stable normal force can be obtained at the traction transmission portion, a sufficient traction force or a sufficient transmission torque can be ensured, and speed changing can be reliably controlled to a desired transmission ratio.

Further, since the traction transmission portion (the convex curved face of the input roller, the convex curved face of the output ring, and the convex curved face of the transmission ring) is contacted to the first conical portions and the second conical portions of the planetary rollers at the convex curved faces thereof, it is possible to ensure stable traction transmission (traction coefficient) with small variation of an ellipse shape in Hertzian contact.

In the above structure, it is possible to adopt a configuration that a triangle defined by points $P_1, P_2, P_3$ forms an isosceles triangle in which a length of a line segment $P_1P_2$ is equal to that of a line segment $P_1P_3$ in a state that the transmission ring is located at a neutral position where a transmission ratio is zero against the second conical portion, while $P_1$ denotes a contact point of the transmission ring and the second conical portion, $P_2$ denotes a vertex of the first conical portion, and $P_3$ denotes an intersecting point of an extension line of a generating line of the second conical portion being contacted to the transmission ring and an extension line of the generating line of the first conical portion being contacted to the input roller, the generating line of the second conical portion being contacted to the transmission ring is parallel to the center axis line, and the center of a curvature radius of the convex curved face of the input roller is located on a line of a resultant vector of a normal vector indicating exertion of the transmission ring to the second conical portion and a normal vector indicating exertion of the output ring to the first conical portion.

According to the configuration, when the transmission ring is moved in the direction of the center axis line and a thrust load is exerted by the loading cam mechanism, an inclination angle of the isosceles triangle obtained by the points $P_1, P_2, P_3$ against the center axis line is slightly varied. Then, three contact points for performing traction transmission are continuously shifted to positions to minimize the mutual distance on the isosceles triangle. Thus, the planetary rollers can be automatically moved to stable positions without varying the relation of normal forces at the traction transmission portion (i.e., a normal force of the transmission ring and a normal force of the output ring are continuously kept approximately at the same value).

Since the generating line of the second conical portion being contacted to the transmission ring are arranged to be parallel to the center axis line at the neutral position where the transmission ratio is zero, it is possible to easily set the transmission ratio to a target value without causing variation in operation load and operation time for changing rotation speed.

In the above structure, it is possible to adopt a configuration that the loading cam mechanism includes a pair of mutually-faced disc-shaped rotors which can be relatively rotated about the center axis line and at which the mutually-faced arc-shaped cam grooves are arranged, and a rolling body which transmits a torque as being interposed to be capable of rolling between the cam grooves of the pair of disc-shaped rotors, and an urging spring is arranged to exert an urging force so that the pair of disc-shaped rotors are mutually closed in the direction of the center axis line.

For example, in a case that the urging spring is not arranged, when a load is decreased rapidly from a high load operation state, there is a fear that torque transmission is not performed owing to elimination of the normal force at the traction transmission portion caused by elimination of the thrust load due to the loading cam mechanism. However, according to the abovementioned configuration, owing to that the urging spring is arranged, the thrust load necessary for torque transmission can be ensured and torque transmission is prevented from being interrupted.

In the above structure, it is possible to adopt a configuration that the loading cam mechanism includes an output-side loading cam mechanism which is arranged at the output shaft side and an input-side loading cam mechanism which is arranged at the input shaft side, and the urging spring is arranged so as to exert the urging force in the input-side loading cam mechanism or the output-side loading cam mechanism.

According to the configuration, when the load torque is exerted on the output shaft, the thrust load is generated in accordance with the load torque and the whole traction transmission portion (the output ring, the planetary rollers, and the input roller) excepting the transmission ring are pressed toward the input shaft while the transmission ring remains stopped. Accordingly, the transmission ratio becomes small (the reduction ratio becomes large) by the pressed (moved) amount of the planetary rollers toward the input shaft. Thus, when the load torque of the output shaft becomes large, the transmission ratio becomes small and shift-down can be performed automatically.

Here, the degree of reduction of the transmission ratio against the load torque can be adjusted by appropriately setting a spring constant of the urging spring.

In the above structure, it is possible to adopt a configuration that the loading cam mechanism includes an output-side loading cam mechanism which is arranged at the output shaft side and an input-side loading cam mechanism which is arranged at the input shaft side, and the output-side loading cam mechanism is arranged to have dimensions so that the rolling body is not separated from the cam grooves even when separation distance between the pair of disc-shaped rotors in the direction of the center axis line is maximized in a mutual relation among the cam grooves of the pair of disc-shaped rotors and the rolling body.

According to the configuration having the structure that the output ring is capable of being moved toward the input shaft, even when fluctuation occurs in the load torque to be exerted to the output shaft in a state that a cam width of the loading cam mechanism (a separation distance between the pair of disc-shaped rotors in the direction of the center axis line) is the largest with a large transmission ratio, the rolling body is prevented from being separated (dropping) from the cam grooves and desired functions can be ensured.

In the above structure, it is possible to adopt a configuration that the loading cam mechanism includes an output-side loading cam mechanism which is arranged at the output shaft side and an input-side loading cam mechanism which is arranged at the input shaft side, cam grooves are formed in the input-side loading cam mechanism so that only a torque is transmitted without generating a thrust load when the torque is exerted from the input shaft and a thrust load is generated when a torque is exerted from the output shaft, and cam grooves are formed in the output-side loading cam mechanism so that a thrust load is generated when a torque is exerted from the input shaft and only a torque is transmitted without generating a thrust load when the torque is exerted from the output shaft.

According to the configuration, even in a case that a torque (reverse torque) is exerted from the output shaft as engine braking, it is possible to prevent the traction transmission portion from being locked with an excessive thrust load exerted to the output ring. Further, since a thrust load is generated and an engine load is transmitted owing to operation of the input-side loading cam mechanism, engine braking can be ensured.

In the above structure, it is possible to adopt a configuration that each of the movable holder and the output ring includes an outer circumferential face which is faced to an inner wall face of the housing as having a predetermined gap, and a plurality of outer circumferential grooves each having a predetermined inclination angle against the center axis line are formed at the outer circumferential face to exert a pumping action to lubricant oil in the housing.

According to the configuration, without arranging a dedicated oil pump, the lubricant oil for traction poured into the housing can be supplied to regions such as the bearing for the input shaft and the output shaft as exerting a circulation action thereto with rotation of the transmission ring and the output ring. Accordingly, it is possible to prevent seizing and the like of the bearing and the like even at high-load operation.

In the above structure, it is possible to adopt a configuration that the device further includes a rotation sensor which is arranged to be faced to the outer circumferential face of the output ring.

According to the configuration, rotation speed of the output shaft can be detected using the plurality of outer circumferential grooves formed at the outer circumferential face of the output ring as slits for sensing without arranging a dedicated component.

In the above structure, it is possible to adopt a configuration that the device further includes a drive mechanism which drives the transmission ring in the direction of the center axis line. Further, the drive mechanism includes a lead screw which is extended in parallel to the center axis line, a nut which is screwed to the lead screw, a drive source which rotates the lead screw, and a guide shaft which guides the transmission ring in the direction of the center axis line, and the transmission ring includes a fit hole to which the guide shaft is slidably fitted, and an accommodation portion which accommodates the nut to be incapable of being rotated and capable of being inclined.

According to the configuration, when the drive source is activated, the lead screw is rotated and the nut is moved. Accordingly, the transmission ring is moved in the direction of the center axis line to a position for a desired transmission ratio as being guided by the guide shaft.

Here, since the nut is accommodated by the accommodation portion and held to be capable of being inclined relatively against the transmission ring, that is, the transmission ring is held in a swingable manner, a screwing state of the nut with the lead screw is not affected even if the transmission ring is inclined when moved. Accordingly, smooth driving can be obtained as preventing biting at a screwing area and wearing and the like at the screwing area can be prevented.

In the above structure, it is possible to adopt a configuration that the movable holder or the housing includes a regulating portion which regulates movement of the transmission ring by having the transmission ring be abutted thereto to regulate interference with the planetary rollers when the transmission ring is moved in the direction of the center axis line.

According to the configuration, the transmission ring can be prevented from being interfered with apart (e.g., the guard portion) of the planetary rollers as being abutted to the regulating portion even when, for example, the transmission ring is moved excessively toward a larger transmission ratio side as being contacted to the second conical portion. Accordingly, desired functions can be ensured.

According to the continuously variable transmission device having the abovementioned structure, a stable normal force can be obtained at the traction transmission portion in accordance with an output load by automatically balancing the planetary rollers at appropriate positions, the traction transmission portion can be prevented from being locked during deceleration or the like, smooth operation of functional components can be obtained by ensuring an internal lubrication action, a sufficient traction force or a sufficient transmission torque can be ensured, and speed changing can be reliably controlled to a desired transmission ratio, while achieving structural simplification, miniaturization, functional reliability improvement, and the like.

BRIEF DESCRIPTION OF THE DRAWINGS

FIG. 4 is an explanatory view illustrating mutual relations among a planetary roller, an input roller, an output ring, and a transmission ring which are included in the continuously variable transmission device illustrated in FIG. 1.

EMBODIMENT OF THE INVENTION

In the following, embodiments of the present invention will be described with reference to the attached drawings.

Figure 1:
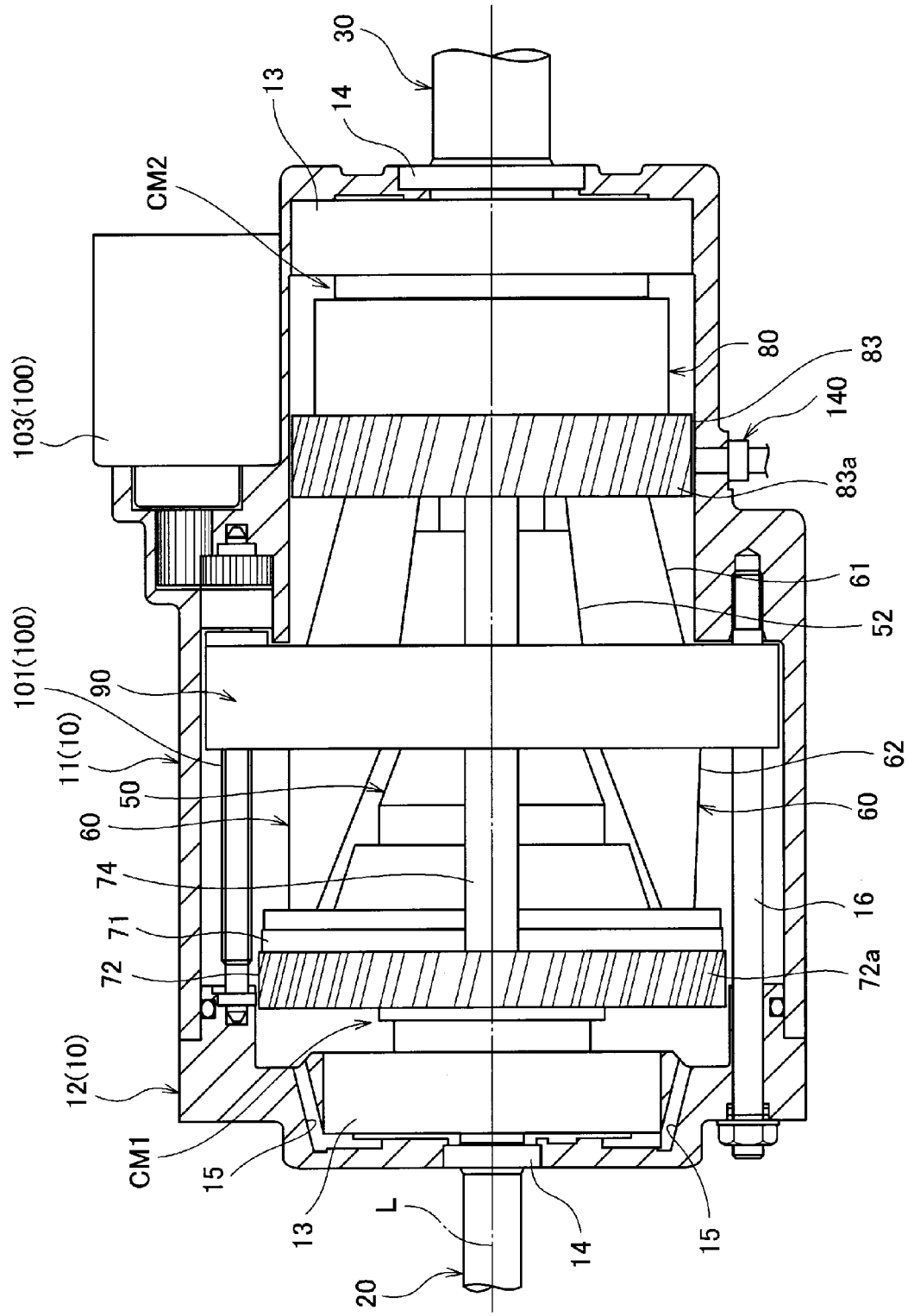
FIG. 1 is a partial sectional view illustrating an embodiment of a continuously variable transmission device according to the present invention.
Figure 2:
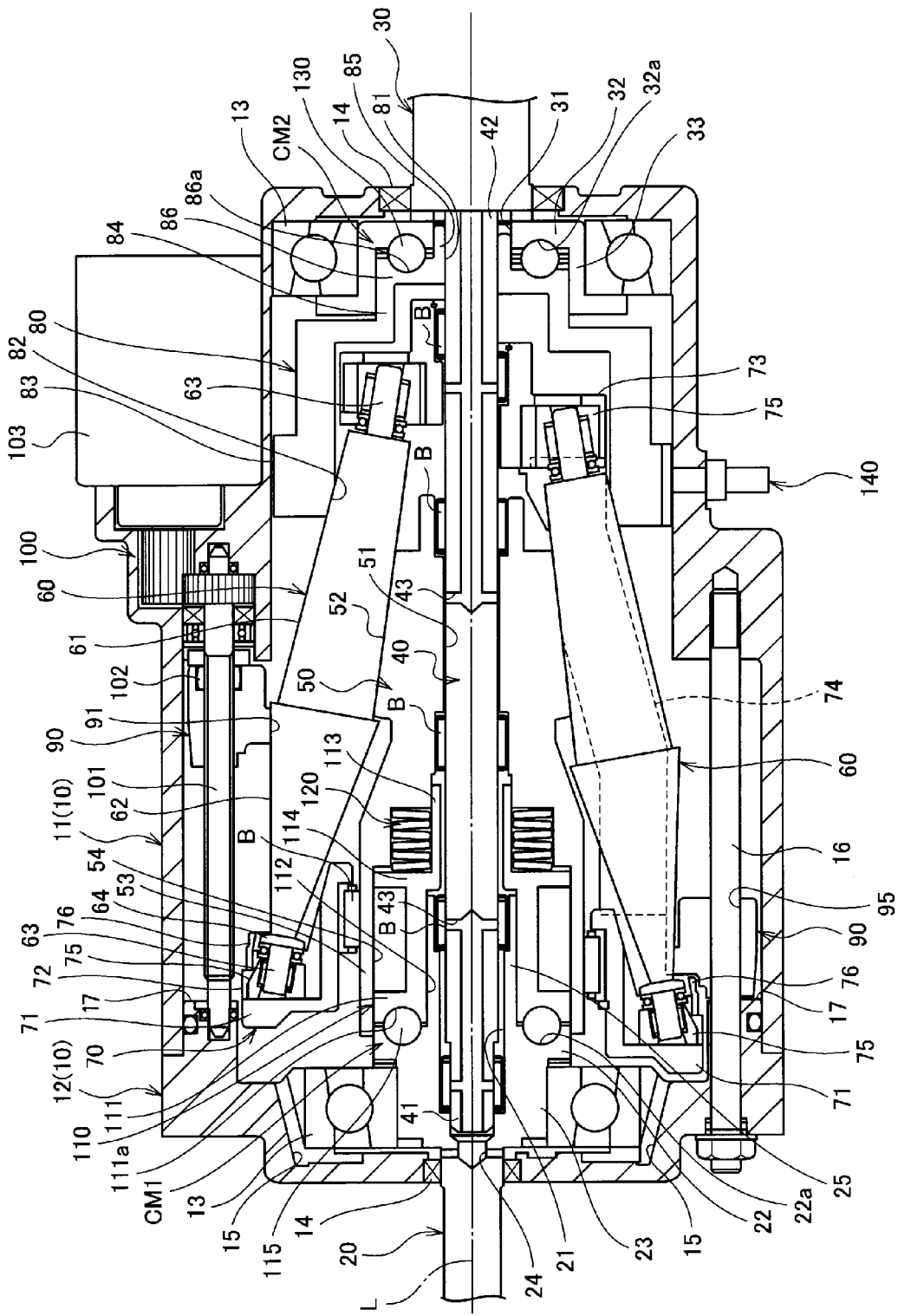
FIG. 2 is a sectional view illustrating the interior of the continuously variable transmission device illustrated in FIG. 1, while the upper half part and the lower half part illustrate different states respectively.
Figure 3:
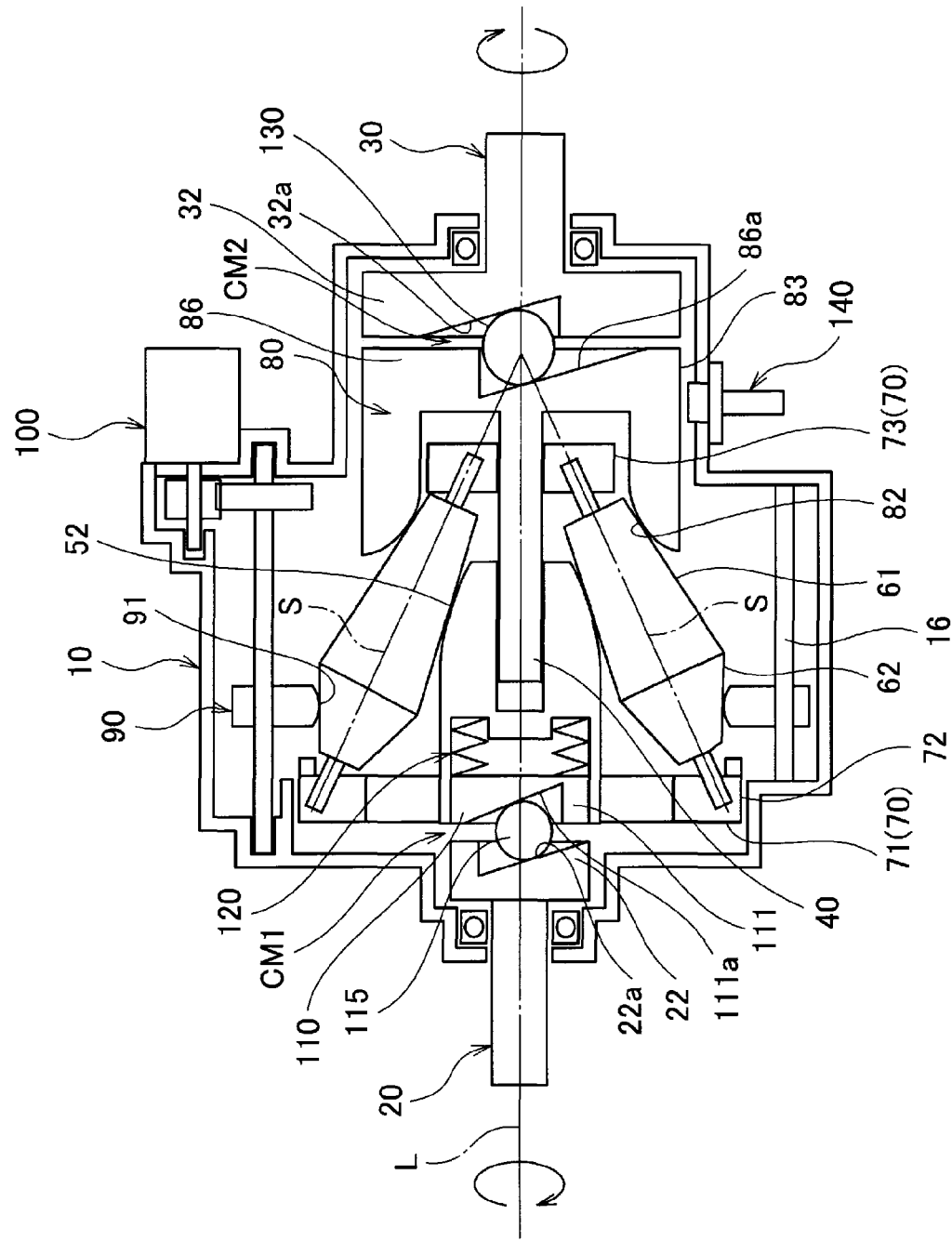
FIG. 3 is a schematic view illustrating the interior of the continuously variable transmission device illustrated in FIG. 1.

As illustrated in FIGS. 1 to 3, a continuously variable transmission device includes a housing 10, an input shaft 20 which is rotatably supported by the housing 10 as having a center axial line L, an output shaft 30 which is rotatably supported by the housing 10 coaxially with the input shaft 20 as having the center axis line L, a center shaft 40 which is arranged between the input shaft 20 and the output shaft 30 coaxially therewith (as having the center axis line L), an input roller 50 which is rotatable integrally with the input shaft 20 (as being interlocked therewith), a plurality (in this example, six) of planetary rollers 60 which are rotated as being externally contacted to the input roller 50, a movable holder 70 which holds the plurality of planetary rollers 60 to be capable of rotating about each rotation axis line S and revolving about the center axis line L, an output ring 80 to which the planetary rollers 60 are internally contacted to be capable of rolling and which is supported rotatably about the center axis line L, a transmission ring 90 to which the planetary rollers 60 are internally contacted to be capable of rolling while the internally-contacted position is shifted in a direction of the center axis line L, a drive mechanism 100 which drives the transmission ring 90, an input-side loading cam mechanism CM1, an urging spring 120, an output-side loading cam mechanism CM2, a rotation sensor 140 which is fixed to the housing 10, and the like.

As illustrated in FIG. 2, the housing 10 includes a housing main body portion 11 and a flange wall portion 12 which support the input shaft 20 to be rotatable, bearings 13, ring seals 14, an oil passage 15, a connection guide rod 16 which connects the housing main body portion 11 and the flange wall portion 12 and functions as a guide shaft to guide the transmission ring 90, a regulating portion 17 which regulates movement of the transmission ring 90 by having the transmission ring 90 be abutted thereto, and the like.

Further, lubricant oil is poured into the housing 10 to be supplied onto contact faces at a traction transmission portion where a traction force is generated, other slide faces and roll faces, and the like.

Figure 5A:
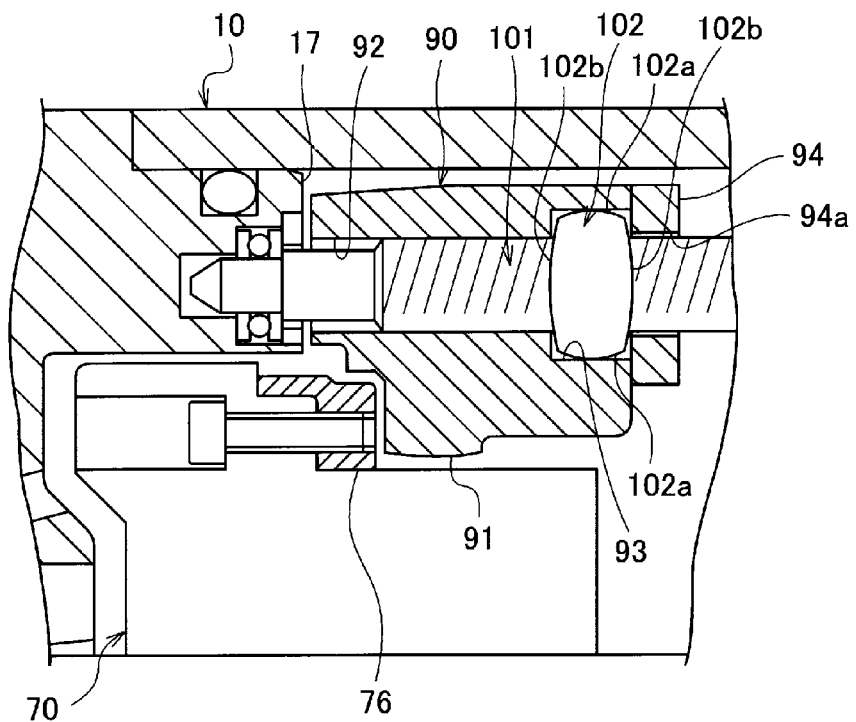
FIG. 5A is a partial sectional view illustrating a regulating portion which regulates interference between the transmission ring and the planetary roller which are included in the continuously variable transmission device illustrated in FIG. 1.
Figure 5B:
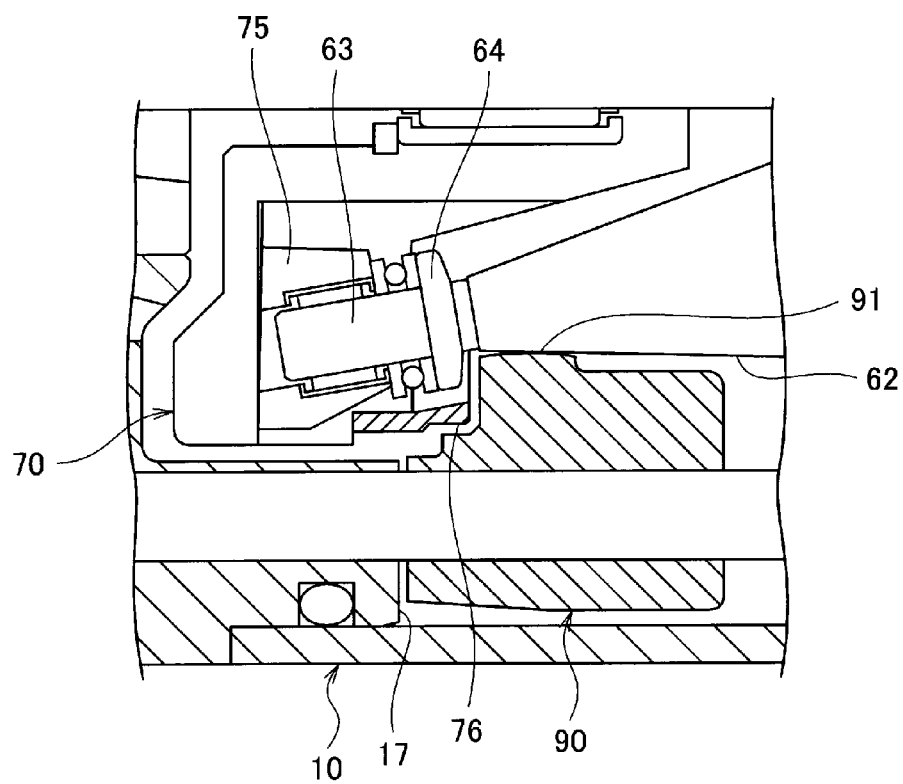
FIG. 5B is a partial sectional view illustrating the regulating portion which regulates interference between the transmission ring and the planetary roller which are included in the continuously variable transmission device illustrated in FIG. 1.

As illustrated in FIGS. 5A and 5B, the Regulating Portion 17 is arranged to regulate movement of the transmission ring 90 by having the transmission ring 90 be abutted thereto so that the transmission ring 90 is prevented from being interfered with a part (guard portion 64) of the planetary rollers 60 when the transmission ring 90 is moved in a direction of the center axis line L.

Since the regulating portion 17 is arranged at the housing 10, the transmission ring 90 can be prevented from being interfered with a part (e.g., the guard portion 64) of the planetary rollers 60 as being abutted to the regulating portion 17 even when the transmission ring 90 is moved excessively toward a larger transmission ratio side as being contacted to a second conical portion 62. Accordingly, desired functions can be ensured.

As illustrated in FIG. 2, the input shaft 20 includes a fit hole 21 to which the center shaft 40 is fitted (via bearings B) as defining the center axis line L, a disc-shaped guard portion 22 as a disc-shaped rotor included in the input-side loading cam mechanism CM1, a plurality (three) of arc-shaped cam grooves 22a which are formed at the disc-shaped guard portion 22, a cylinder portion 23 which is supported by the bearing 13, an oil passage 24, a small-diameter cylinder portion 25, and the like.

Further, as illustrated in FIG. 2, the input shaft 20 is arranged to be rotatable about the center axis line L (coaxially with the output shaft 30 and the center shaft 40) as being supported by the housing 10 via the bearing 13, the ring seals 14, and the like.

As illustrated in FIG. 2, the output shaft 30 includes a fit hole 31 to which the center shaft 40 is fitted (via a cylinder portion 85 of the output ring 80) as defining the center axis line L, a disc-shaped guard portion 32 as a disc-shaped rotor included in the output-side loading cam mechanism CM2, a plurality (three) of arc-shaped cam grooves 32a which are formed at the disc-shaped guard portion 32, a cylinder portion 33 which is supported by the bearing 13, and the like.

Further, as illustrated in FIG. 2, the output shaft 30 is arranged to be rotatable about the center axis line L (coaxially with the input shaft 20 and the center shaft 40) as being supported by the housing 10 via the bearing 13, the ring seal 14, and the like.

As illustrated in FIG. 2, the center shaft 40 is arranged to be rotatable relatively to the input shaft 20 and the output shaft 30 as defining the center axis line L with one end part 41 fitted to the input shaft 20 and the other end part 42 fitted to the output shaft 30.

Further, as illustrated in FIG. 2, the center shaft 40 includes an oil passage 43 which introduces lubrication oil at the inside thereof.

As illustrated in FIGS. 2 and 3, the input roller 50 is arranged to have the rotation center thereof on the center axis line L. The input roller 50 includes a through hole 51 to which the center shaft 40 is fitted (via the bearing B in part), an outer circumferential face 52 as a convex curved face having a predetermined curvature on which first conical portions 61 of the planetary rollers 60 roll, a cylinder portion 53 which supports the movable holder 70 to be rotatable, a concave portion 54 which is formed at the inside of the cylinder portion 53, and the like.

As illustrated in FIG. 4, the outer circumferential face 52 is formed so that the center $O_1$ of a curvature radius $R_{52}$ thereof is located on a line L4 of a resultant vector $V_{12}$ of a normal vector $V_1$ indicating exertion of the transmission ring 90 to the second conical portion 62 of the planetary roller 60 and a normal vector $V_2$ indicating exertion of the output ring 80 to the first conical portion 61 of the planetary roller 60.

The concave portion 54 is formed to accommodate a rotor 110 which forms a part of the input-side loading cam mechanism CM1 and the urging spring 120. Here, the concave portion 54 is formed to receive the rotor 110 to be movable in the direction of the center axis line L and to be rotatable about the center axis line L integrally with the input roller 50.

As illustrated in FIGS. 2 and 3, each of the plurality (six) of planetary rollers 60 includes the first conical portion 61 which rolls as being externally contacted to (the outer circumferential face 52 as a convex curved face of) the input roller 50 and being internally contacted to (an inner circumferential face 82 as a convex curved face of) the output ring 80, the second conical portion 62 which rolls as being internally contacted to (an inner circumferential face 91 as a convex curved face of) the transmission ring 90, a shaft portion 63 which defines the rotation axis line S, the guard portion 64 which is formed at one end of the second conical portion 62, and the like.

As illustrated in FIG. 4, the first conical portion 61 is formed to be tapered toward a tip $P_2$ on the rotation axis line S. Here, the first conical portion 61 is contacted to (the outer circumferential face 52 of) the input roller 50 and (the inner circumferential face 82 of) the output ring 80 as being sandwiched thereby.

As illustrated in FIG. 4, the second conical portion 62 is formed to be taped toward the opposite direction (toward opposite side to the tip $P_2$) continuously from the first conical portion 61. Here, the second conical portion 62 is contacted to (the inner circumferential face 91 of) the transmission ring 90.

As illustrated in FIG. 2, the shaft portion 63 is supported to be movable in the radial direction perpendicular to the center axis line L as being held by a bearing holding portion 75 of the movable holder 70.

That is, the plurality of planetary rollers 60 are held by the movable holder 70 in a state that the respective rotation axis lines S are arranged at equal intervals in an imaginary conical face having the vertex thereof on the center axis line L, and that the first conical portion 61 is externally contacted to the input roller 50 and internally contacted to the output ring 80 while the second conical portion 62 is internally contacted to the transmission ring 90. Accordingly, each of the planetary rollers 60 is capable of rotating about the rotation axis line S and revolving about the center axis line L and, as illustrated in FIG. 4, an inclination angle θ of the rotation axis line S against the center axis line L can be varied.

As illustrated in FIGS. 1 to 3, the movable holder 70 is formed to have a framework structure (bird cage shape) as being held rotatably about the center axis line L not to be contacted to other components in the housing 10. The movable holder 70 includes a large-diameter cylinder portion 71 which is held by the cylinder portion 53 of the input roller 50 via a bearing B, an outer circumferential face 72 which is formed at the large-diameter cylinder portion 71 to be faced to an inner wall face of the housing 10 as having a predetermined gap, a small-diameter cylinder portion 73 which is held by the center shaft 40 via the bearing B, a connecting portion 74 which integrally connects the large-diameter cylinder portion 71 and the small-diameter cylinder portion 73, the bearing holding portion 75 which is movable in the radial direction as supporting the shaft portions 63 of the planetary rollers 60, a regulating portion 76 which regulates movement of the transmission ring 90 in an abnormal action such that movement (inclining action) of the planetary rollers 60 is delayed from the movement of the transmission ring 90 when the transmission ring 90 is moved.

As illustrated in FIG. 1, a plurality of outer circumferential grooves 72a each having a predetermined inclination angle against the center axis line L are formed at the outer circumferential face 72 to exert a pumping action to the lubricant oil in the housing 10.

According to the above, without arranging a dedicated oil pump, the lubricant oil for traction poured into the housing 10 can be supplied to regions such as the bearing for the input shaft 20 as exerting a circulation action thereto with rotation of the movable holder 70. Accordingly, it is possible to prevent seizing and the like of the bearing and the like even at high-load operation.

As illustrated in FIGS. 2 and 3, the movable holder 70 holds the plurality (six in this example) of planetary rollers 60 to be capable of rotating about the respective rotation axis line S and revolving about the center axis line L in a state of being arranged at equal intervals in the imaginary conical face having the vertex thereon on the center axis line L.

The bearing holding portion 75 is movable in the radial direction perpendicular to the center axis line L and supports the planetary rollers 60 so that the inclination angle θ of the rotation axis lines S of the planetary rollers 60 against the center axis line L is variable.

As illustrated in FIGS. 5A and 5B, the regulating portion 76 is arranged to have the transmission ring 90 be abutted thereto so as to regulate movement of the transmission ring 90 in an abnormal action such that movement (inclining action) of the planetary rollers 60 is delayed from the movement of the transmission ring 90 when the transmission ring 90 is moved in a direction toward the center axis line L so that the transmission ring 90 is prevented from being interfered with a part (the guard portion 64) of the planetary rollers 60.

Since the regulating portion 76 is arranged at the movable holder 70, the transmission ring 90 can be prevented from being interfered with a part (e.g., the guard portion 64) of the planetary rollers 60 as being abutted to the regulating portion 76 even when the transmission ring 90 is moved excessively toward a larger transmission ratio side as being contacted to the second conical portion 62. Accordingly, desired functions can be ensured.

As illustrated in FIGS. 2 to 4, the output ring 80 is arranged to have the rotation center thereof on the center axis line L. The output ring 80 includes a fit hole 81 to which the center shaft 40 is rotatably fitted, the inner circumferential face 82 on which the first conical portions 61 of the planetary rollers 60 roll as being internally contacted thereto, an outer circumferential face 83 which is faced to the inner wall face of the housing 10 as having a predetermined gap, cylinder portions 84, 85, a disc-shaped guard portion 86 as a disc-shaped rotor included in the output-side loading cam mechanism CM2, a plurality (three) of arc-shaped cam grooves 86a which are formed at the disc-shaped guard portion 86, and the like.

As illustrated in FIGS. 3 and 4, the inner circumferential face 82 is formed to have a convex curved face having a predetermined curvature (a curvature radius $R_{82}$ from the center $O_3$) on a plane which includes the rotation axis line S of the planetary roller 60 and the center axis line L.

Figure 6:
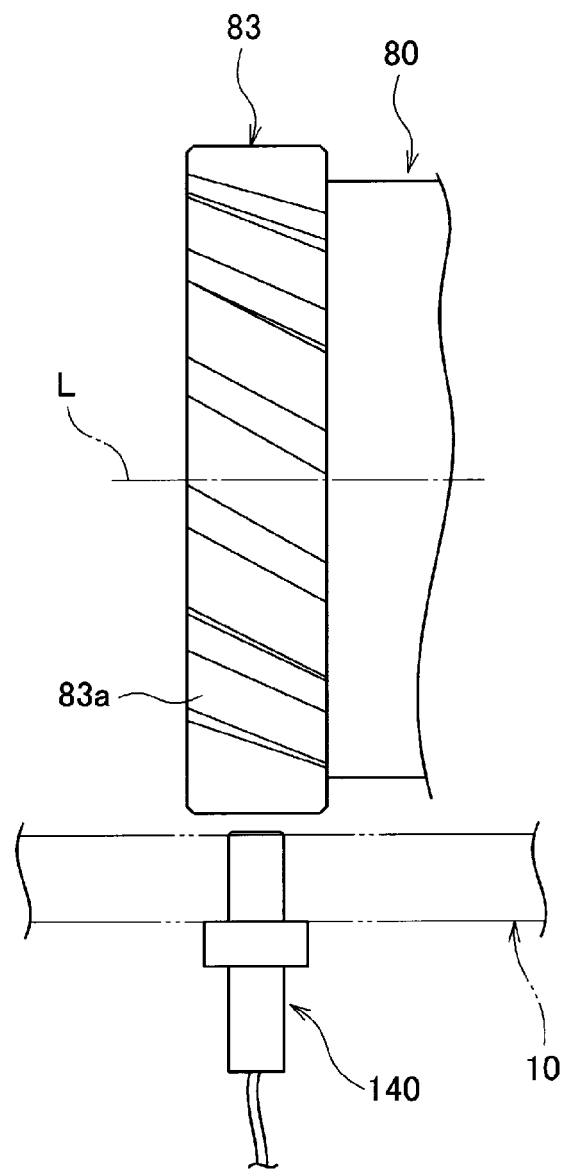
FIG. 6 is a partial view illustrating outer circumferential grooves which are formed at an outer circumferential face of the output ring and a rotation sensor which are included in the continuously variable transmission device illustrated in FIG. 1.

As illustrated in FIGS. 1 and 6, a plurality of outer circumferential grooves 83a each having a predetermined inclination angle against the center axis line L are formed at the outer circumferential face 83 to exert a pumping action to the lubricant oil in the housing 10.

According to the above, without arranging a dedicated oil pump, the lubricant oil for traction poured into the housing 10 can be supplied to regions such as the bearing for the output shaft 30 as exerting a circulation action thereto with rotation of the output ring 80. Accordingly, it is possible to prevent seizing and the like of the bearing and the like even at high-load operation.

The cylinder portions 84, 85 are arranged to rotatably support the disc-shaped guard portion 32 serving as another disc-shaped rotor included in the output-side loading cam mechanism CM2.

Owing to rotation and revolution of the planetary rollers 60, a traction force thereof causes the output ring 80 to be rotated integrally with the output shaft 30 about the center axis line L.

Figure 7A:
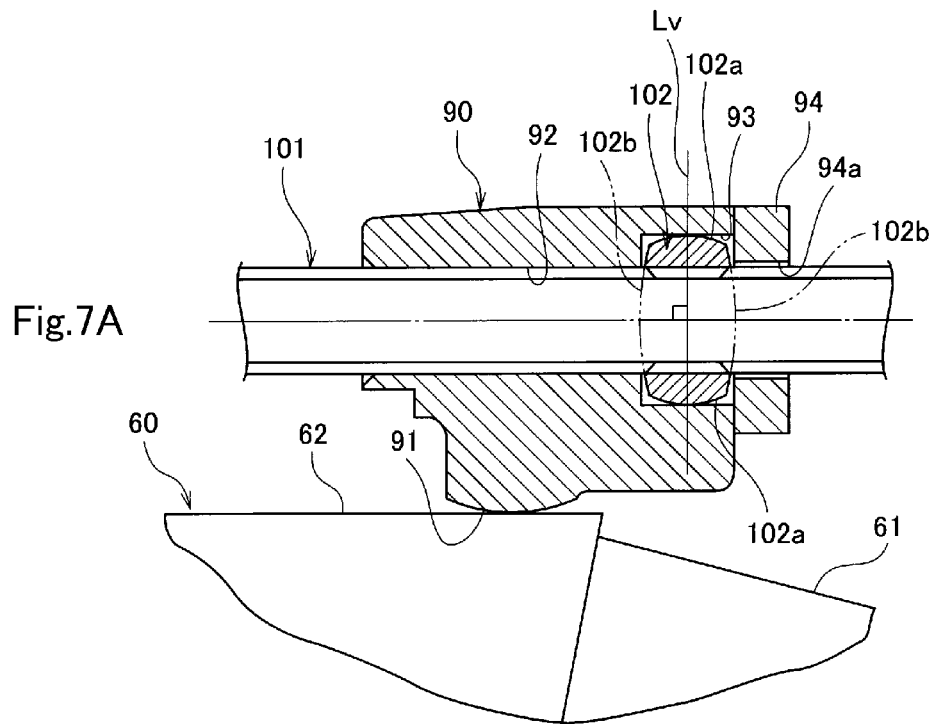
FIG. 7A is a partial sectional view illustrating a lead screw and a nut which structure is part of a drive mechanism and the transmission ring illustrated in FIG. 1.
Figure 7B:
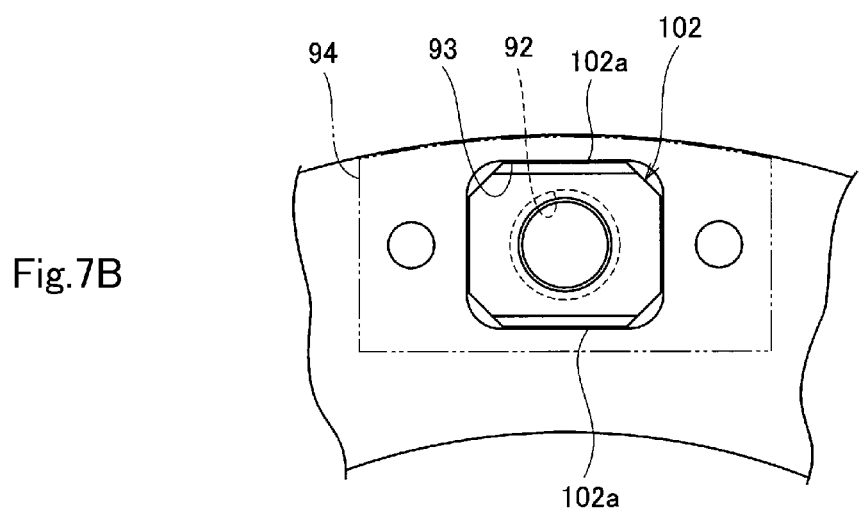
FIG. 7B is a partial side view illustrating the lead screw and the nut which structure is part of the drive mechanism and the transmission ring illustrated in FIG. 1.

As illustrated in FIGS. 2, 7A, and 7B, the transmission ring 90 is formed into a ring shape as having the center thereof on the center axis line L. The transmission ring 90 includes the inner circumferential face 91 which is contacted to the second conical portions 62 of the planetary rollers 60, a through-hole 92 through which a lead screw 101 as a part of the drive mechanism 100 passes, an accommodation portion 93 which defines an approximately-rectangular inner space for accommodating a nut 102 screwed to the lead screw 101 to be incapable of being rotated and capable of being inclined, a cover portion 94 to be fixed to prevent the nut 102 from dropping after being accommodated by the accommodation portion 93, a fit hole 95 to which the connection guide rod 16 as a guide shaft is fitted in a slidable manner, and the like.

As illustrated in FIGS. 3 and 4, the inner circumferential face 91 is formed to have a convex curved face having a predetermined curvature (a curvature radius $R_{91}$ from the center $O_2$) on a plane which includes the rotation axis line S of the planetary roller 60 and the center axis line L.

As illustrated in FIGS. 7A and 7B, the cover portion 94 includes a through-hole 94a through which the lead screw 101 passes without being contacted thereto. The cover portion 94 is fixed with a screw and the like after the nut 102 is accommodated by the accommodation portion 93.

The transmission ring 90 is supported in the housing 10 to be reciprocatable in a predetermined movement range in the direction of the center axis line L in a state of being held as being incapable of being rotated about the center axis line L. Thus, the transmission ring 90 is moved to a desired position by the drive mechanism 100 so that the transmission ratio is varied. That is, as illustrated in FIG. 4, when the transmission ring 90 is located at a neutral position N (where a generating line which defines the first conical portion 61 intersects with a generating line which defines the second conical portion 62), the transmission ratio is zero, that is, the output ring 80 is in a stopped state while the planetary rollers 60 roll against the output ring 80. When the transmission ring 90 is moved leftward from the neutral position N, the transmission ratio becomes large to be at a top position T. When the transmission ring 90 is moved rightward from the neutral position N, the transmission ring 90 reaches a reverse position R (where the output ring 80 is rotated reversely).

Next, mutual relations among the input roller 50, the planetary rollers 60, the output ring 80, and the transmission ring 90 will be described with reference to FIG. 4. Here, $P_1$ denotes a contact point of the transmission ring 90 and the second conical portion 62, $P_2$ denotes a vertex of the first conical portion 61, and $P_3$ denotes an intersecting point of an extension line L2 of the generating line of the second conical portion 62 being contacted to the transmission ring 90 and an extension line L3 of the generating line of the first conical portion 61 being contacted to the input roller 50. In a state that the transmission ring 90 is located at the neutral position N where the transmission ratio is zero against the second conical portion 62, the triangle defined by the points $P_1$, $P_2$, $P_3$ forms an isosceles triangle in which a length of a line segment $P_1P_2$ is equal to that of a line segment $P_1P_3$. The generating line (extension line L2) of the second conical portion 62 being contacted to the transmission ring 90 is parallel to the center axis line L (i.e., an angle θ1 is equal to an angle θ2 in FIG. 4). Further, the center $O_1$ of the curvature radius $R_{52}$ of the convex curved face (i.e., the outer circumferential face 52) of the input roller 50 is located on the line L4 of the resultant vector $V_{12}$ of the normal vector $V_1$ indicating exertion of the transmission ring 90 to the second conical portion 62 and the normal vector $V_2$ indicating exertion of the output ring 80 to the first conical portion 61.

According to the above, when the transmission ring 90 is moved in the direction of the center axis line L and a thrust load is exerted by the loading cam mechanisms CM1, CM2, an inclination angle of the isosceles triangle obtained by the points $P_1$, $P_2$, $P_3$ against the center axis line L is slightly varied. Then, three contact points $P_1$, $P_4$, $P_5$ for performing traction transmission are continuously shifted to positions to minimize the mutual distance on the isosceles triangle. Thus, the planetary rollers 60 can be automatically moved to stable positions without varying the relation of normal forces at the traction transmission portion (i.e., a normal force |V1| of the transmission ring 90 and a normal force |V2| of the output ring 80 are continuously kept approximately at the same value).

Since the generating line (extension line L2) of the second conical portion 62 being contacted to the transmission ring 90 is arranged to be parallel to the center axis line L at the neutral position N where the transmission ratio is zero, it is possible to easily set the transmission ratio to a target value without causing variation in operation load and operation time for changing rotation speed.

Further, owing to that an initial positions of the planetary rollers 60 are set with reference to the neutral position N where the transmission ratio is zero, positions of the planetary rollers 60 when the transmission ring 90 is moved can be easily calculated.

As illustrated in FIGS. 1 and 2, the drive mechanism 100 includes the lead screw 101 which is rotatably supported in the housing 10 as being arranged to be extended in parallel to the center axis line L, the nut 102 which is swingably held by the accommodation portion 93 of the transmission ring 90 as being screwed to the lead screw 101, a drive source 103 (a gear train and a motor) which rotates the lead screw 101, a guide shaft (the connection guide rod 16) which guides the transmission ring 90 in the direction of the center axis line L, and the like.

When the drive source 103 is rotated in one direction, the transmission ring 90 is moved leftward in FIG. 2 (to the acceleration side). On the contrary, when the drive source 103 is rotated in the opposite direction, the transmission ring 90 is moved rightward in FIG. 2 (to the deceleration, stopping, and reverse rotation side).

That is, owing to that the drive mechanism 100 moves the transmission ring 90 in the direction of the center axis line L, internal contact positions where the second conical portions 62 of the planetary rollers 60 are internally contacted to the inner circumferential face 91 are shifted. Thus, continuous variable speed changing is performed.

As illustrated in FIGS. 5, 7A, and 7B, the nut 102 has an approximately rectangular outline and is shaped so that two faces located in a direction of a straight line Lv perpendicular to the center axis line L are formed as convex curved faces 102a. Further, two faces located in a direction parallel to the center axis line L (an extension direction of the lead screw 101) are formed as convex curved faces 102b. Owing to that the nut 102 is accommodated by the accommodation portion 93 of the transmission ring 90 as being incapable of being rotated and the cover portion 94 is fixed from the outside, the nut 102 can be held to be capable of being inclined against the transmission ring 90.

Since the transmission ring 90 is capable of being inclined, that is, swingable, in a state that the nut 102 is screwed to the lead screw 101, a screwing state of the nut 102 with the lead screw 101 is not affected even if the transmission ring 90 is inclined when moved. Accordingly, smooth driving can be obtained as preventing biting at a screwing area and wearing and the like at the screwing area can be prevented.

As illustrated in FIGS. 2 and 3, the input-side loading cam mechanism CM1 includes a disc-shaped guard portion 22 having a plurality (three) of arc-shaped cam grooves 22a, a rotor 110 which includes a disc-shaped guard portion 111 having a plurality (three) of arc-shaped cam grooves 111a which are faced to the cam grooves 22a of the disc-shaped guard portion 22, and a rolling body 115 having a plurality (three) of spherical bodies which are interposed as being capable of rolling respectively between the cam grooves 22a of the disc-shaped guard portion 22 and the cam grooves 111a of the disc-shaped guard portion 111.

As illustrated in FIG. 2, the rotor 110 includes the disc-shaped guard portion 111 having the cam grooves 111a, a fit hole 112 to which the small-diameter cylinder portion 25 of the input shaft 20 is fitted in a relatively rotatable manner, a small-diameter cylinder portion 113, and a ring-shaped stepped portion 114.

The rotor 110 is arranged in a concave portion 54 of the input roller 50 so as to be movable in the direction of the center axis line L and to be rotated about the center axis line L integrally with the input roller 50.

That is, the disc-shaped guard portion 22 and the disc-shaped guard portion 111 structure a pair of mutually-faced disc-shaped rotors which can be relatively rotated about the center axis line L and at which the mutually-faced arc-shaped cam grooves 22a, 111a are arranged.

In the input-side loading cam mechanism CM1, when a torque difference is generated between the disc-shaped guard portion 22 and the disc-shaped guard portion 111, a cam action is received by the cam grooves 22a, 111a via the rolling body 115 and a thrust load is generated in the direction of the center axis line L. Accordingly, (the outer circumferential face 52 of) the input roller 50 is pressed by the first conical portions 61 of the planetary rollers 60 and the normal force is increased.

As illustrated in FIGS. 2 and 3, the output-side loading cam mechanism CM2 includes a disc-shaped guard portion 86 having a plurality (three) of arc-shaped cam grooves 86a, the disc-shaped guard portion 32 of the output shaft 30 having the plurality (three) of cam grooves 32a which are faced to the cam grooves 86a of the disc-shaped guard portion 86, and a rolling body 130 having a plurality (three) of spherical bodies which are interposed as being capable of rolling respectively between the cam grooves 86a of the disc-shaped guard portion 86 and the cam grooves 32a of the disc-shaped guard portion 32.

That is, the disc-shaped guard portion 86 and the disc-shaped guard portion 32 structure a pair of mutually-faced disc-shaped rotors which can be relatively rotated about the center axis line L and at which the mutually-faced arc-shaped cam grooves 86a, 32a are arranged.

In the output-side loading cam mechanism CM2, when a torque difference is generated between the disc-shaped guard portion 86 and the disc-shaped guard portion 32, a cam action is received by the cam grooves 86a, 32a via the rolling body 130 and a thrust load is generated in the direction of the center axis line L. Accordingly, the output ring 80 is pressed by the first conical portions 61 of the planetary rollers 60 and the normal force is increased.

Figure 8A:
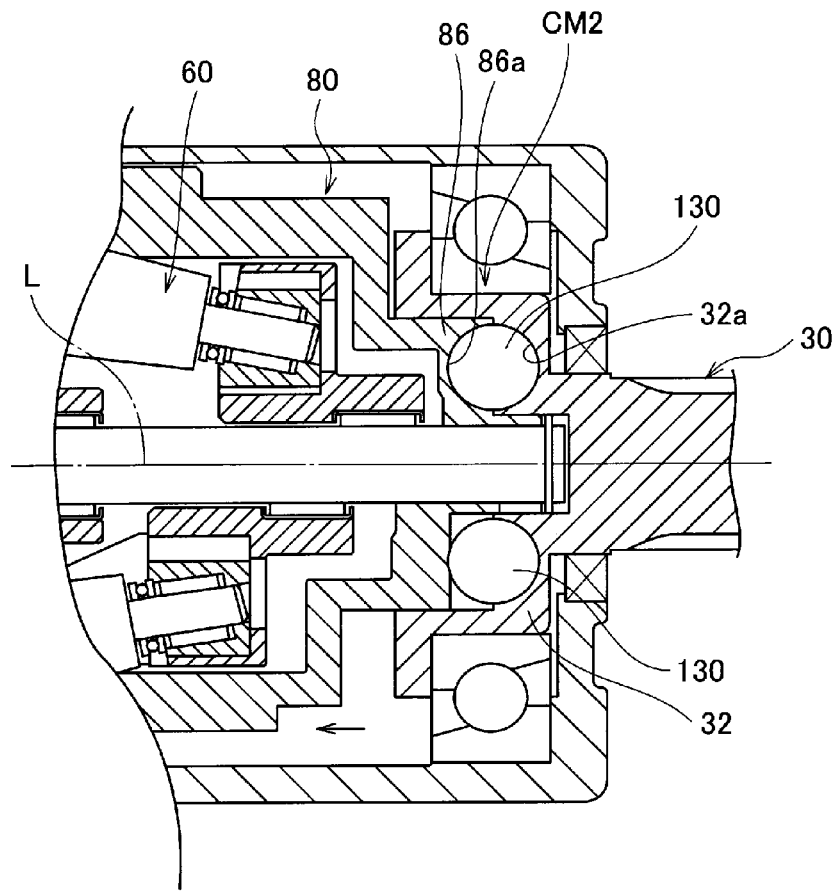
FIG. 8A is a partial sectional view illustrating an output-side loading cam mechanism which is included in the continuously variable transmission device illustrated in FIG. 1.
Figure 8B:
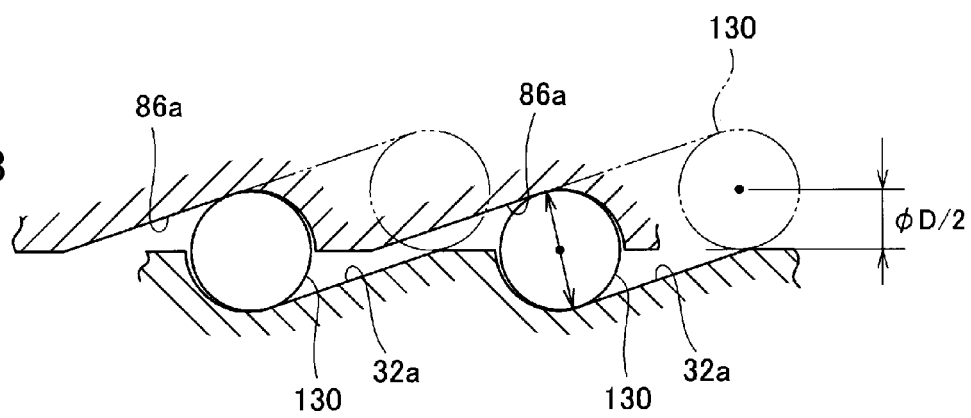
FIG. 8B is a schematic view illustrating a relation between a rolling body and a cam groove in the output-side loading cam mechanism which is included in the continuously variable transmission device illustrated in FIG. 1.

Further, as illustrated in FIGS. 8A and 8B, according to the output-side loading cam mechanism CM2, in a mutual relation among the cam grooves 86a, 32a of the pair of disc-shaped rotors (disc-shaped guard portions 86, 32) and the rolling body 130, a dimension $\phi D/2$ (diameter $\phi D$) of the rolling body 130 is determined so that the rolling body 130 is not separated from the cam grooves 86a, 32a even when separation distance between the pair of disc-shaped rotors (the disc-shaped guard portion 86 and the disc-shaped guard portion 32) in the direction of the center axis line L is maximized, that is, so that the rolling body 130 is not separated from the cam grooves 86a, 32a even when the separation distance between the pair of disc-shaped guard portions 86, 32 is maximized with the output ring 80 moved toward the input shaft 20.

According to the above, even when fluctuation occurs in the load torque to be exerted to the output shaft 30 in a state that a cam width of the output-side loading cam mechanism CM2 (a separation distance between the pair of disc-shaped rotors in the direction of the center axis line L) is the largest with a large transmission ratio, the rolling body 130 is prevented from being separated (dropping) from the cam grooves 86a, 32a and desired functions can be ensured.

The urging spring 120 is a disc spring or the like, for example. As illustrated in FIG. 2, the urging spring 120 is arranged in the concave portion 54 of the input roller 50 in a state of being compressed as being abutted to the ring-shaped stepped portion 114 of the rotor 110 so as to exert an urging force so that the disc-shaped guard portion 22 and the disc-shaped guard portion 111 are mutually closed in the direction of the center axis line L.

For example, in a case that the urging spring 120 is not arranged, when a load is decreased rapidly from a high load operation state, there is a fear that torque transmission is not performed owing to elimination of the normal force at the traction transmission portion caused by elimination of the thrust load due to the loading cam mechanisms CM1, CM2. However, owing to that the urging spring 120 is arranged, the thrust load necessary for torque transmission can be ensured and torque transmission is prevented from being interrupted.

Further, in the structure adopting the input-side loading cam mechanism CM1, the output-side loading cam mechanism CM2, and the urging spring 120 at the input side or the output side (the input side in this example) as described above, when the load torque is exerted on the output shaft 30, the thrust load is generated in accordance with the load torque and the whole traction transmission portion (the output ring 80, the planetary rollers 60, and the input roller 50) excepting the transmission ring 90 are pressed toward the input shaft 20 while the transmission ring 90 remains stopped. Accordingly, the transmission ratio becomes small (the reduction ratio becomes large) by the pressed (moved) amount of the planetary rollers 60 toward the input shaft 20.

Thus, when the load torque of the output shaft becomes large, the transmission ratio becomes small and shift-down can be performed automatically.

Here, the degree of reduction of the transmission ratio against the load torque can be adjusted by appropriately setting a spring constant of the urging spring 120.

As illustrated in FIGS. 2 and 6, the rotation sensor 140 is fixed to the housing 10 as being faced to the outer circumferential face 83 of the output ring 80 which is arranged in the housing 10.

The rotation sensor 140 is to detect rotation speed of the output ring 80, that is, rotation speed of the output shaft 30, by detecting a plurality of the outer circumferential grooves 83a formed at the outer circumferential face 83 as slits for sensing (i.e., patterns of mountains and valleys).

Thus, since the outer circumferential grooves 83a formed at the outer circumferential face 83 of the output ring 80 is used for detecting rotation speed as well as the circulation pump for lubricant oil, the rotation speed of the output shaft 30 can be detected without arranging a dedicated component.

Next, description will be provided on operation of the continuously variable transmission device having the above-mentioned structure.

First, when the input shaft 20 starts to be rotated from a stopped state, the input roller 50 is pressed to the planetary rollers 60 with the thrust load generated by the input-side loading cam mechanism CM1 and a normal force (i.e., traction force) at a predetermined level or higher is generated. Then, the torque (rotational drive force) is transmitted to the output shaft 30 via the input roller 50, the planetary rollers 60, the output ring 80, and the output-side loading cam mechanism CM2.

Then, the transmission ring 90 is appropriately driven by the drive mechanism 100 and the rotation speed changed via the input roller 50, the plurality of planetary rollers 60, and the output ring 80 is output as the rotation drive force from the output shaft 30 via the output-side loading cam mechanism CM2.

Here, the input roller 50, the output ring 80, and the transmission ring 90 are arranged so that each face (the outer circumferential face 52, the inner circumferential faces 82, 91) being contacted to the planetary roller 60 is formed as a convex curved face having a predetermined curvature (curvature radii $R_{52}$, $R_{82}$, $R_{91}$) on a plane which includes the rotation axis line S of the planetary roller 60 and the center axis line L and the planetary roller 60 is supported by the movable holder 70 so that the inclination angle θ of the rotation axis line S thereof is variable against the center axis line L. Accordingly, when the transmission ring 90 is moved in the direction of the center axis line L, the planetary roller 60 is automatically balanced to a position where a moment exerted to the planetary roller 60 is continuously zero (a position where continuously the moment is not generated, that is, a position where normal forces at the three contact points $P_1$, $P_4$, $P_5$ are balanced) while the inclination angle θ of the rotation axis line S thereof is appropriately varied in a state of being contacted to the outer circumferential face 52 of the input roller 50, the inner circumferential face 82 of the output ring 80, and the inner circumferential face 91 of the transmission ring 90.

Accordingly, an excessive force can be prevented from being exerted on the planetary rollers 60, a stable normal force can be obtained at the traction transmission portion, a sufficient traction force or a sufficient transmission torque can be ensured, and speed changing can be reliably controlled to a desired transmission ratio.

Further, since the traction transmission portion (the outer circumferential face 52 of the input roller 50, the inner circumferential face 82 of the output ring 80, and the inner circumferential face 91 of the transmission ring 90) is contacted to the first conical portions 61 and the second conical portions 62 of the planetary rollers 60 at the convex curved faces thereof, it is possible to ensure stable traction transmission (traction coefficient) with small variation of an ellipse shape in Hertzian contact.

Further, when the load toque is exerted on the output shaft 30, the thrust load is generated by the output-side loading cam mechanism CM2 in accordance with the load torque and the whole traction transmission portion (the output ring 80, the planetary rollers 60, and the input roller 50) excepting the transmission ring 90 are pressed toward the input shaft 20. Accordingly, the transmission ratio becomes small (the reduction ratio becomes large) by the pressed (moved) amount of the planetary rollers 60 toward the input shaft 20 and shift-down is performed automatically.

As described above, according to the continuously variable transmission device of the present invention, the planetary rollers 60 are automatically balanced at appropriate positions while achieving structural simplification, miniaturization, functional reliability improvement, and the like. Accordingly, a stable normal force can be obtained at the traction transmission portion in accordance with an output load, an internal lubrication action can be ensured, smooth operation of functional components can be ensured, a sufficient traction force or a sufficient transmission torque can be ensured, and speed changing can be reliably controlled to a desired transmission ratio.

Figure 9:
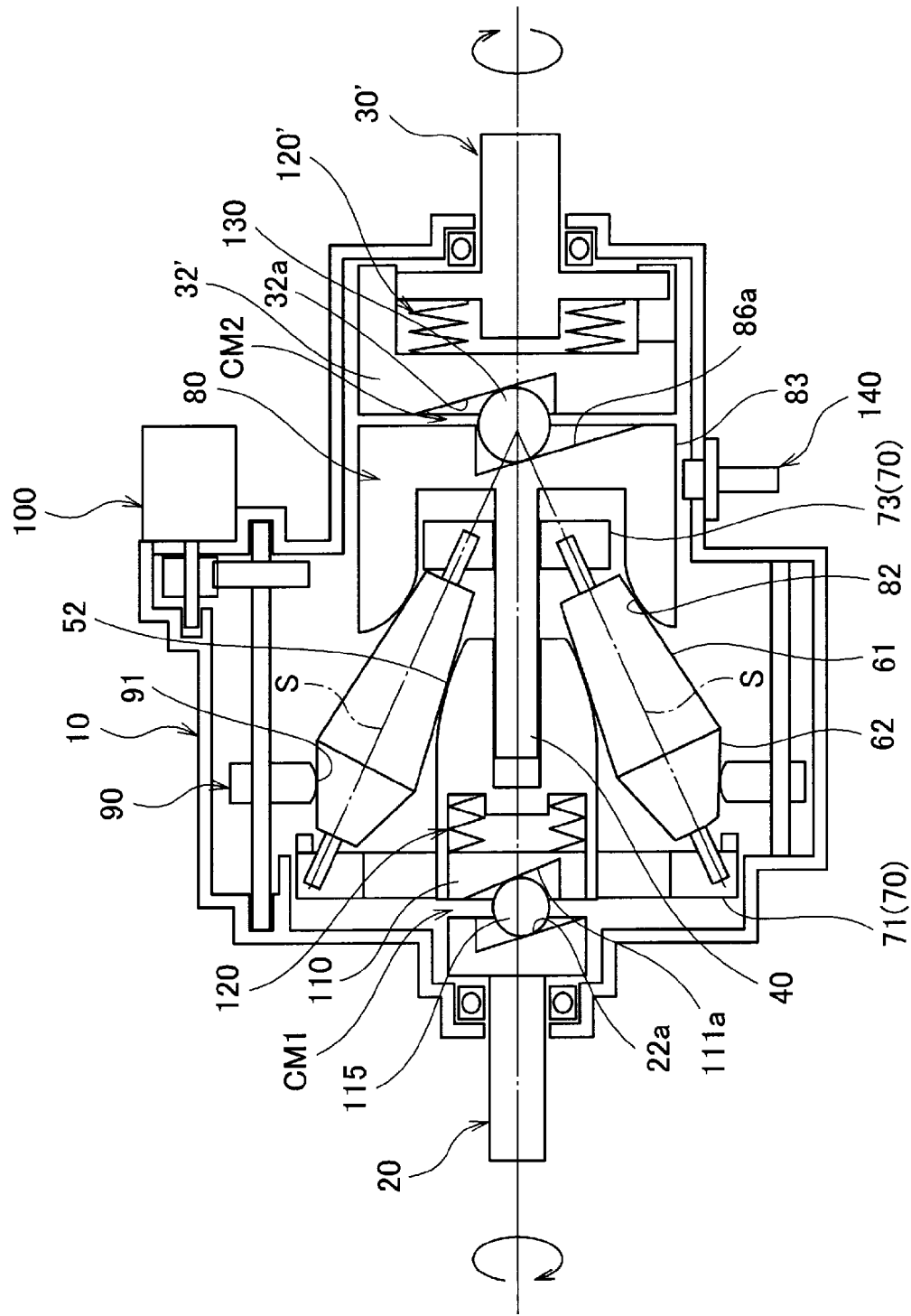
FIG. 9 is a schematic view illustrating a continuously variable transmission device of another embodiment according to the present invention.

FIG. 9 illustrates a continuously variable transmission device of another embodiment of the present invention. Compared with the embodiment illustrated in FIG. 3, an output shaft 30' is modified and an urging spring 120' is arranged also at the output shaft 30' side. Since the rest thereof is the same as the abovementioned embodiment, the same reference is given to the same structure and description thereof is skipped.

As illustrated in FIG. 9, in the continuously variable transmission device, a disc-shaped rotor (disc-shaped guard portion) 32' structuring the output-side loading cam mechanism CM2 is formed separately from the output shaft 30'. The output shaft 30' and the disc-shaped rotor 32' are connected to be integrally rotated about the center axis line L as being relatively movable in the direction of the center axis line L. Further, the urging spring 120' is arranged between the output shaft 30' and the disc-shaped rotor 32' to exert an urging force so that the pair of disc-shaped rotors (the disc-shaped guard portion 86 and the disc-shaped rotor 32') are mutually closed in the direction of the center axis line L.

In a case that the urging springs 120, 120' are not arranged, when a load is decreased rapidly from a high load operation state, there is a fear that torque transmission is not performed owing to elimination of the normal force at the traction transmission portion caused by elimination of the thrust load due to the loading cam mechanisms CM1, CM2. However, similarly to the above, in the present embodiment as well, owing to that the urging springs 120, 120' are arranged, the thrust load necessary for torque transmission can be ensured and torque transmission s prevented from being interrupted.

Figure 10:
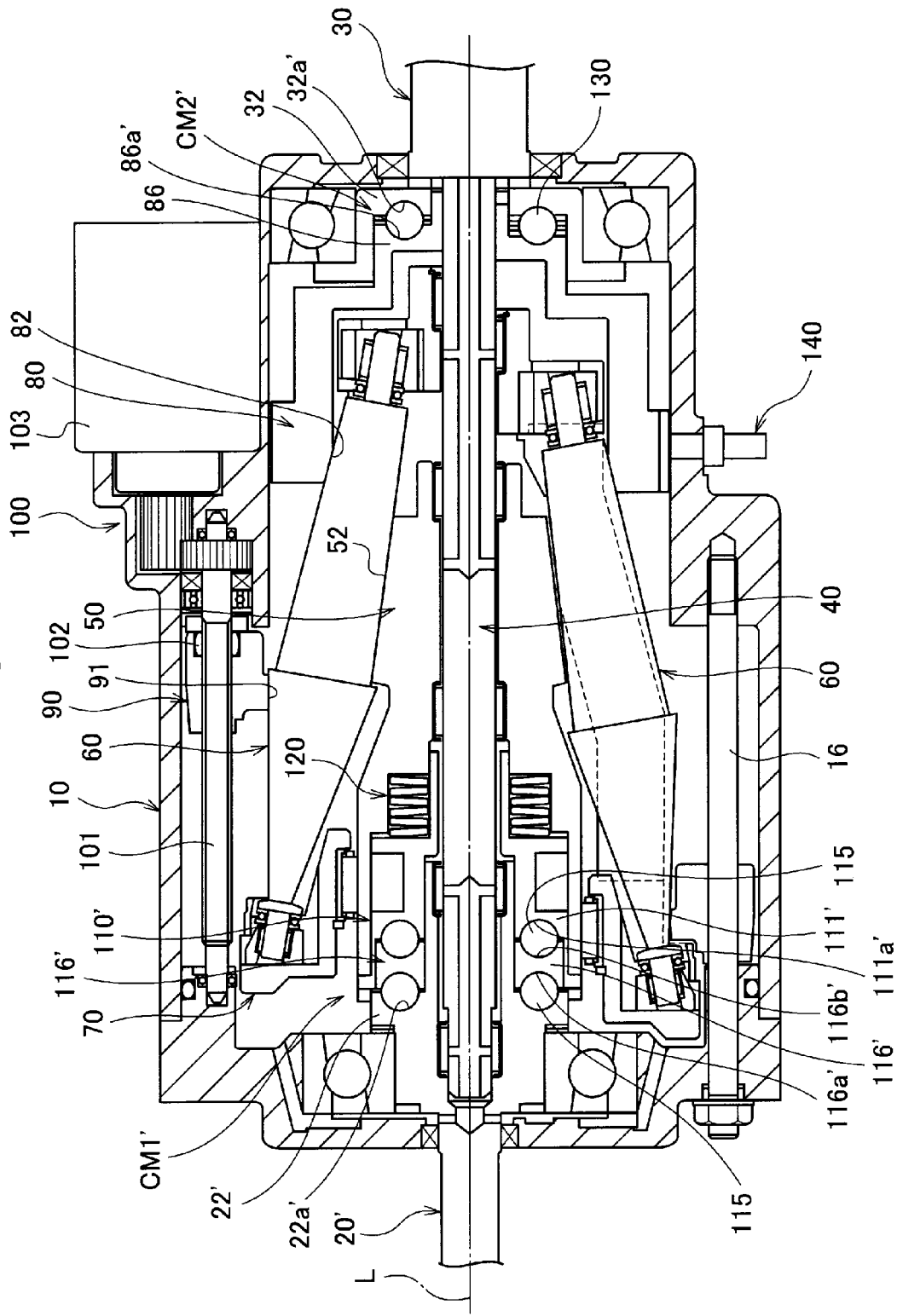
FIG. 10 is a sectional view illustrating a continuously variable transmission device of another embodiment according to the present invention, while the upper half part and the lower half part illustrate different states respectively.

FIG. 10 illustrates a continuously variable transmission device of another embodiment of the present invention. Compared with the embodiment illustrated in FIG. 2, an input shaft 20', an input-side loading cam mechanism CM1', and an output-side loading cam mechanism CM2' are modified. Since the rest thereof is the same as the abovementioned embodiment, the same reference is given to the same structure and description thereof is skipped.

The input shaft 20' includes a disc-shaped guard portion 22' having a plurality (three) of cam grooves 22a' functioning as a pair of disc-shaped rotors, and the like.

Further, the input-side loading cam mechanism CM1' includes the disc-shaped guard portion 22', a rotor 110' having a disc-shaped guard portion 111', a disc-shaped rotor 116' interposed between the disc-shaped guard portion 22' and the disc-shaped guard portion 111', and the rolling body 115.

The disc-shaped rotor 116' includes a plurality (three) of arc-shaped cam grooves 116a' which are faced to the cam grooves 22a' of the disc-shaped guard portion 22', and a plurality (three) of arc-shaped cam grooves 116b' which are faced to the cam grooves 111a' of the disc-shaped guard portion 111'.

The rolling body 115 is arranged between the cam groove 22a' and the cam groove 116a' and the rolling body 115 is arranged between the cam groove 116b' and the cam groove 111a'.

Further, the output-side loading cam mechanism CM2' includes the disc-shaped guard portion 86 of the output ring 80, the disc-shaped guard portion 32 of the output shaft 30, and the rolling body 130. The disc-shaped guard portion 86 includes a plurality (three) of arc-shaped cam grooves 86a' and the disc-shaped guard portion 32 includes a plurality (three) of arc-shaped cam grooves 32a'.

In the input-side loading cam mechanism CM1', the cam grooves 22a', 116a', 116b', 111a' are formed so that only a torque is transmitted without generating a thrust load when the torque is exerted from the input shaft 20' and a thrust load is generated when a torque is exerted from the output shaft 30'.

Further, in the output-side loading cam mechanism CM2', the cam grooves 86a', 32a' are formed so that a thrust load is generated when a torque is exerted from the input shaft 20' and only a torque is transmitted without generating a thrust load when the torque is exerted from the output shaft 30'.

According to the above, even in a case that a torque (reverse torque) is exerted from the output shaft 30' as engine braking, it is possible to prevent the traction transmission portion from being locked with an excessive thrust load exerted to the output ring 80. Further, since a thrust load is generated and an engine load is transmitted owing to operation of the input-side loading cam mechanism CM1', engine braking can be ensured.

In the description of the abovementioned embodiments, six planetary rollers 60 are arranged as the plurality of planetary rollers. However, not limited thereto, the present invention may be applied to a structure having three or any other number of planetary rollers.

Further, in the abovementioned embodiments, the bearing holding portion 75 of the movable holder 70 is arranged to be movable in the radial direction perpendicular to the center axis line L as the supporting structure in which the inclination angle θ of the rotation axis line S of the plurality of the planetary rollers 60 is variable. However, not limited thereto, another supporting structure may be adopted as long as the inclination angle θ is variable.

INDUSTRIAL APPLICABILITY

As described above, according to the continuously variable transmission device of the present invention, a stable normal force can be obtained at the traction transmission portion in accordance with an output load by automatically balancing the planetary rollers at appropriate positions, the traction transmission portion can be prevented from being locked during deceleration or the like, smooth operation of functional components can be obtained by ensuring an internal lubrication action, a sufficient traction force or a sufficient transmission torque can be ensured, and speed changing can be reliably controlled to a desired transmission ratio, while achieving structural simplification, miniaturization, functional reliability improvement, and the like. Accordingly, naturally, the present invention can be applied as a continuously variable transmission device to be mounted on a vehicle such as a motorcycle and an automobile. Moreover, the present invention is useful for a general machine, a constructing machine, an agricultural machine, a working machine, and the like.

EXPLANATION OF REFERENCES

10 Housing
11 Housing main body portion
12 Flange wall portion
13 Bearing
14 Ring seal
15 Oil passage
16 Connection guide rod
17 Regulating portion
L Center axis line
20, 20' Input shaft
21 Fit hole
22, 22' Disc-shaped guard portion (Disc-shaped rotor)
22a, 22a' Cam groove
23 Cylinder portion
24 Oil passage
25 Small-diameter cylinder portion
30, 30' Output shaft
31 Fit hole
32, 32' Disc-shaped guard portion (Disc-shaped rotor)
32a, 32a' Cam groove
33 Cylinder portion
40 Center shaft
41 One end part
42 Other end part
43 Oil passage
50 Input roller
51 Through hole
52 Outer circumferential face (Convex curved face)
53 Cylinder portion
54 Concave portion
60 Planetary roller
61 First conical portion
62 Second conical portion
63 Shaft portion
S Rotation axis line
64 Guard portion
70 Movable holder
71 Large-diameter cylinder portion
72 Outer circumferential face
72a Outer circumferential groove
73 Small-diameter cylinder portion
74 Connecting portion
75 Bearing holding portion
76 Regulating portion
80 Output ring
81 Fit hole
82 Inner circumferential face (Convex curved face)
83 Outer circumferential face
83a Outer circumferential groove
84, 85 Cylinder portion
86 Disc-shaped guard portion (Disc-shaped rotor)
86a, 86a' Cam groove
90 Transmission ring
91 Inner circumferential face (Convex curved face)
92 Through hole 93 Accommodation portion
94 Cover portion
94a Through hole
95 Fit hole
100 Drive mechanism
101 Lead screw
102 Nut
102a Convex curved face
102b Convex curved face
103 Drive source
CM1, CM1' Input-side loading cam mechanism
110, 110' Rotor
111, 111' Disc-shaped guard portion
111a Cam groove
112 Fit hole
113 Small-diameter cylinder portion
114 Ring-shaped stepped portion
115 Rolling body
116' Disc-shaped rotor
116a', 116b' Cam groove
120, 120' Urging spring
CM2 Output-side loading cam mechanism
130 Rolling body
140 Rotation sensor

The invention claimed is:

1. A continuously variable transmission device, comprising:
   a housing;
   an input shaft which has a center axis line;
   an input roller which is rotated integrally with the input shaft;
   an output shaft which is arranged coaxially with the input shaft;
   an output ring which is rotated integrally with the output shaft;
   a transmission ring which is arranged movably in a direction of the center axis line as having the center thereof on the center axis line;
   a plurality of planetary rollers which are arranged at equal intervals in an imaginary conical face having the vertex thereof on the center axis line, each planetary roller including a first conical portion which is externally contacted to the input roller and internally contacted to the output ring and a second conical portion which is internally contacted to the transmission ring;
   a movable holder which holds the plurality of planetary rollers to be capable of rotating about each rotation axis line and revolving about the center axis line; and
   a loading cam mechanism which generates a thrust load in the direction of the center axis line,
   wherein the input roller, the output ring, and the transmission ring are formed so that each face being contacted to the planetary roller is formed to have a convex curved face having a predetermined curvature on a plane which includes the rotation axis line of the planetary roller and the center axis line, and
   the planetary rollers are supported by the movable holder so that an inclination angle of the rotation axis line against the center axis line is variable.

2. The continuously variable transmission device according to claim 1,
   wherein a triangle defined by points $P_1$, $P_2$, $P_3$ forms an isosceles triangle in which a length of a line segment $P_1P_2$ is equal to that of a line segment $P_1P_3$ in a state that the transmission ring is located at a neutral position where a transmission ratio is zero against the second conical portion, while $P_1$ denotes a contact point of the transmission ring and the second conical portion, $P_2$ denotes a vertex of the first conical portion, and $P_3$ denotes an intersecting point of an extension line of a generating line of the second conical portion being contacted to the transmission ring and an extension line of the generating line of the first conical portion being contacted to the input roller,
   the generating line of the second conical portion being contacted to the transmission ring is parallel to the center axis line, and
   the center of a curvature radius of the convex curved face of the input roller is located on a line of a resultant vector of a normal vector indicating exertion of the transmission ring to the second conical portion and a normal vector indicating exertion of the output ring to the first conical portion.

3. The continuously variable transmission device according to claim 1,
   wherein the loading cam mechanism includes a pair of mutually-faced disc-shaped rotors which can be relatively rotated about the center axis line and at which the mutually-faced arc-shaped cam grooves are arranged, and a rolling body which transmits a torque as being interposed to be capable of rolling between the cam grooves of the pair of disc-shaped rotors, and
   an urging spring is arranged to exert an urging force so that the pair of disc-shaped rotors are mutually closed in the direction of the center axis line.

4. The continuously variable transmission device according to claim 3,
   wherein the loading cam mechanism includes an output-side loading cam mechanism which is arranged at the output shaft side and an input-side loading cam mechanism which is arranged at the input shaft side, and
   the urging spring is arranged so as to exert the urging force in the input-side loading cam mechanism or the output-side loading cam mechanism.

5. The continuously variable transmission device according to claim 3,
   wherein the loading cam mechanism includes an output-side loading cam mechanism which is arranged at the output shaft side and an input-side loading cam mechanism which is arranged at the input shaft side, and
   the output-side loading cam mechanism is arranged to have dimensions so that the rolling body is not separated from the cam grooves even when separation distance between the pair of disc-shaped rotors in the direction of the center axis line is maximized in a mutual relation among the cam grooves of the pair of disc-shaped rotors and the rolling body.

6. The continuously variable transmission device according to claim 3,
   wherein the loading cam mechanism includes an output-side loading cam mechanism which is arranged at the output shaft side and an input-side loading cam mechanism which is arranged at the input shaft side,
   cam grooves are formed in the input-side loading cam mechanism so that only a torque is transmitted without generating a thrust load when the torque is exerted from the input shaft and a thrust load is generated when a torque is exerted from the output shaft, and
   cam grooves are formed in the output-side loading cam mechanism so that a thrust load is generated when a torque is exerted from the input shaft and only a torque is transmitted without generating a thrust load when the torque is exerted from the output shaft.

7. The continuously variable transmission device according to claim 1,
wherein each of the movable holder and the output ring includes an outer circumferential face which is faced to an inner wall face of the housing as having a predetermined gap, and
a plurality of outer circumferential grooves each having a predetermined inclination angle against the center axis line are formed at the outer circumferential face to exert a pumping action to lubricant oil in the housing.

8. The continuously variable transmission device according to claim 7, further comprising a rotation sensor which is arranged to be faced to the outer circumferential face of the output ring.

9. The continuously variable transmission device according to claim 1, further comprising a drive mechanism which drives the transmission ring in the direction of the center axis line,
wherein the drive mechanism includes a lead screw which is extended in parallel to the center axis line, a nut which is screwed to the lead screw, a drive source which rotates the lead screw, and a guide shaft which guides the transmission ring in the direction of the center axis line, and
the transmission ring includes a fit hole to which the guide shaft is slidably fitted, and an accommodation portion which accommodates the nut to be incapable of being rotated and capable of being inclined.

10. The continuously variable transmission device according to claim 1,
wherein the movable holder or the housing includes a regulating portion which regulates movement of the transmission ring by having the transmission ring be abutted thereto to regulate interference with the planetary rollers when the transmission ring is moved in the direction of the center axis line.

* * * * *